United States Patent [19]

Anello et al.

[11] Patent Number: 5,291,981
[45] Date of Patent: Mar. 8, 1994

[54] COIN BUCKET CHANGE RETURN AND BANK BOX PROTECTION DEVICE

[75] Inventors: Salvatore Anello; Nathan Turk, both of Highland, N.Y.

[73] Assignee: Sandt Technology, Ltd., Highland, N.Y.

[21] Appl. No.: 953,729

[22] Filed: Sep. 29, 1992

Related U.S. Application Data

[63] Continuation-in-part of Ser. No. 932,959, Aug. 21, 1992, abandoned, which is a continuation-in-part of Ser. No. 907,601, Jul. 2, 1992, abandoned.

[51] Int. Cl.$^5$ .................. H04M 17/00; B65G 11/00
[52] U.S. Cl. .................. 194/350; 379/145; 379/437; 232/15; 232/16
[58] Field of Search .............. 194/202, 350; 312/211, 312/212; 232/12, 15, 16; 379/437, 451, 145

[56] References Cited

U.S. PATENT DOCUMENTS

| | | | |
|---|---|---|---|
| 3,846,594 | 11/1974 | Morrell et al. | 379/451 |
| 3,926,366 | 12/1975 | Sciortino | 232/16 X |
| 4,186,977 | 2/1980 | Gilovich et al. | 232/15 X |
| 5,054,056 | 10/1991 | Blythe | 194/202 X |
| 5,058,966 | 10/1991 | McGough | 194/350 X |
| 5,131,035 | 7/1992 | Ohayon | 194/202 X |
| 5,155,765 | 10/1992 | McGough | 194/202 X |
| 5,187,738 | 2/1993 | Zausner | 379/145 |
| 5,193,113 | 3/1993 | McGough | 379/437 |

Primary Examiner—Michael S. Huppert
Assistant Examiner—Scott L. Lowe
Attorney, Agent, or Firm—Morgan & Finnegan

[57] ABSTRACT

An improvement in a coin operated device having coin return bucket and a bank box wherein the coin return bucket and the bank box are mounted within the device near a bottom wall of the device. The improvement relates to preventing tampering with and/or vandalization of the device by cutting or penetration of a bottom wall of the coin return bucket or the inner wall of the bank box. The improvement lies in the use of a bottom wall protection plate which prevents tampering and/or vandalization and which is inserted between the bottom wall of the device and the bottom of the coin return bucket and an inner side wall protection plate inserted between the inner wall of the coin return bucket and the inner wall of the bank box. The bottom wall protection plate is so configured as to generally follow the contour of the bottom of the coin return bucket and has a rear portion which extends downwardly to the bottom wall of the device and front portion of which lies along the bottom wall of the device and which stabilizes the bottom wall protection plate from movement within the device. The inner side wall protection plate is configured to be inserted between the inner wall of the coin return bucket and the controlling plate of the bank box and the bottom wall of the bank box and the exterior bottom wall of the device.

14 Claims, 5 Drawing Sheets

COIN BUCKET CHANGE RETURN AND BANK BOX PROTECTION DEVICE

CROSS REFERENCE TO RELATED APPLICATION

This is a continuation-in-part application of application Ser. No. 07/932,959, filed Aug. 21, 1992, now abandoned which is in turn a continuation-in-part application of 07/907,601, filed Jul. 2, 1992, now abandoned.

BACKGROUND OF THE INVENTION

1. Field of the Invention

The present invention relates generally to a coin bucket and bank box protection device and, more particularly, to a device which can be attached to existing coin bucket and bank box of a coin-operated device to prevent tampering with the coin bucket and bank box and preventing vandalism thereto.

2. Description of the Prior Art

The payphone coin return mechanisms in use today typically comprise a hollow body having front and back walls and top and bottom walls which are joined by opposing side walls. An intermediate wall is situated between the top and bottom walls and extends from a point below the back of the top wall downwardly toward the front wall to define with the top wall and the side walls a throat for the coin return chute. The bottom wall of the chute extends downwardly from the front wall and then rearwardly upwardly toward the back wall. It thus forms with the intermediate and side walls a trough portion for the chute, the trough extending below and forwardly and rearwardly of the throat.

The front wall of the chute is provided with an opening which is normally closed by a pivotally mounted door and through which a finger of a caller can be inserted to retrieve returned coins delivered to the trough. Another opening is provided at the rear of the top wall of the chute. This opening receives coins which are being returned to a caller from the payphone's coin return mechanism. After the returned coins pass through this opening they fall onto the intermediate wall of the throat and slide downward to the trough at the bottom wall for retrieval by the caller as already described.

Generally, next to the coin return bucket is a "bank box" for storing coins for completed transactions. The bank box has a bottom wall, opposing side walls and a top controlling plate which opens and closes to permit coins to fall into the bank box.

The bank box is constructed of steel and is enclosed by exterior walls and a steel outersheath on the three exposed outer surfaces of the coin operated device. Because of this "double wall" construction, the bank is difficult to penetrate and had not been targeted by thieves until recently.

Theft of coins from payphone coin return chutes as a result of "stuffing" the coin return chute has been a continuing problem in payphones having coin returns of the type described above. Stuffing has been a serious problem for many years. To "stuff" a payphone, the thief inserts a compressible obstruction through the coin return door, past the opening in the front wall and trough, into the throat of the chute. The obstructing material is typically cotton or polyester wadding, paper, fabric or plastic sheeting, and it is used to prevent the coins which would otherwise be return to the payphone user from falling through the coin returned chute. After sufficient time, a sizable number of coins accumulates behind the obstructing material. The blockage is removed by the thief using various means and the coins cascade into the return bucket, ready to be retrieved. The obstructing material can be cleared out either manually or by using implements such as a pick or hook. Some individuals ignite the foreign material so that it burns and turns to ash. This latter technique may also damage the payphone's internal mechanisms.

Early attempts at preventing this type of theft centered around designing the payphone coin return mechanism in such a way that it became disabled when the chute was stuffed. This type of solution is described, for example, in U.S. Pat. Nos.: 1,887,576; 1,901,944; 1,921,071; 1,921,072; and 2,004,615. Although disabling the coin return mechanism prevented the theft of coins, it also made it impossible to return coins to the caller in the event a call was not completed. Disabling the coin return mechanism was not an entirely satisfactory solution to the theft problem, since it was not feasible to return the coins to a caller immediately. The returning of money for uncompleted telephone calls would require an additional message to an operator and forwarding a check to the caller. This process is very costly and inefficient.

The payphone stuffing problem is an old one and various solutions have been found. This crime costs the phone companies enormous sums of money. Although the phone companies would not normally collect the money lost to the "stuffers," since in properly working payphones the coins are returned for uncompleted calls, the phone companies usually have to refund the money lost to their customers. Furthermore, each phone company must employ personnel to investigate reports of payphones failing to return change, employ maintenance workers to examine and repair "stuffed" phones, and have accounting and payment systems in place to refund lost money to payphone users. The overall administrative cost of repairing payphones and refunding lost money are quite high, and there is a substantial need for an inexpensive device which can be quickly and simply installed in an existing payphone and reliably prevents stuffing.

More recent attempts to prevent this type of theft involved designing a return chute which is more difficult to stuff. In particular, the back wall of the chute below the intermediate wall was brought forward, reducing the area of the trough available for a thief to work in when attempting to insert the stuffing material. The back wall was replaced by an opening closed by a pivoting door so that the obstructing material might pass out of the chute. These modifications, however, did not prove successful and there is still a need for a more effective way of preventing the stuffing of payphone coin return chutes.

U.S. Pat. No 4,761,809 describes another attempt to design an "unstuffable" coin return. A tubular member having pointed teeth at its front end is inserted into the coin return door. A blade having additional sharpened teeth is attached to the lower surface of the intermediate wall of the throat. These teeth are intended to slice up obstructing material so it cannot form blockages, but actual usage of this modification reveals rather that the teeth facilitate stuffing because they catch and hold the stuffing material.

The present inventors had provided solutions to the stuffing problem of payphones as taught in U.S. Pat.

No. 4,946,095 and U.S. Pat. No. 4,966,325, the disclosures of which are being incorporated herein by reference thereto.

With the introduction of these various anti-stuffing devices and other protection devices, individuals seeking to steal coins from payphone coin return chutes have attempted to circumvent the anti-stuffing mechanisms and other protection devices associated with the coin return bucket door by cutting through or penetrating the bottom or the inner side wall of the coin return bucket either from the interior of the coin return bucket or from the exterior of the coin operated device. Recently, the thieves have also attempted to penetrate the bank box through its inner side wall. The thieves remove the coin return bucket by force from the exterior casing, then cut through or drill through the inner side wall into the bank box.

It is therefore an object of the present invention to provide a means to reinforce the coin bucket bottom and the inner side wall to protect against penetration through the bottom of the coin return bucket and the inner side wall of the bank box.

Another object of the invention is to provide a coin return protection device which is simple in construction and inexpensive to manufacture.

Still a further object of the invention is to provide a coin return protection device that can be quickly and easily installed in existing payphones or coin-operated vending machines yet which is sturdy, durable and completely effective in preventing puncture and/or penetration of the coin return bucket from below and through the interior of the bucket or the inner side wall for the bank.

Other objects and advantages of the invention will be obvious based on the following description.

The accompanying drawings, referred to herein and constituting a part hereof, illustrate preferred embodiments of the invention, and together with the description, serve to explain the principles of the invention.

DESCRIPTION OF THE PREFERRED EMBODIMENTS

Referring now particularly to FIGS. 1–6 of the accompanying drawings, there is illustrated a preferred embodiment of a coin bucket and bank box reinforcement and protection device constructed in accordance with the present invention. As here preferably embodied, the modifications are advantageously adapted for use in public payphones coin returns. While the apparatus for our invention as here embodied is particularly adapted to and was designed for use in public payphones the principles of operation of the invention are not limited to such usage. However, since the invention is especially suitable for such usage, reference will be made hereinafter thereto in order to provide an example of a practical and useful embodiment of the invention.

It will also be understood that the present invention is not limited to use in payphones, but may be adapted to use in other types of coin-operated machinery by slight changes in dimensions.

Figure 1:
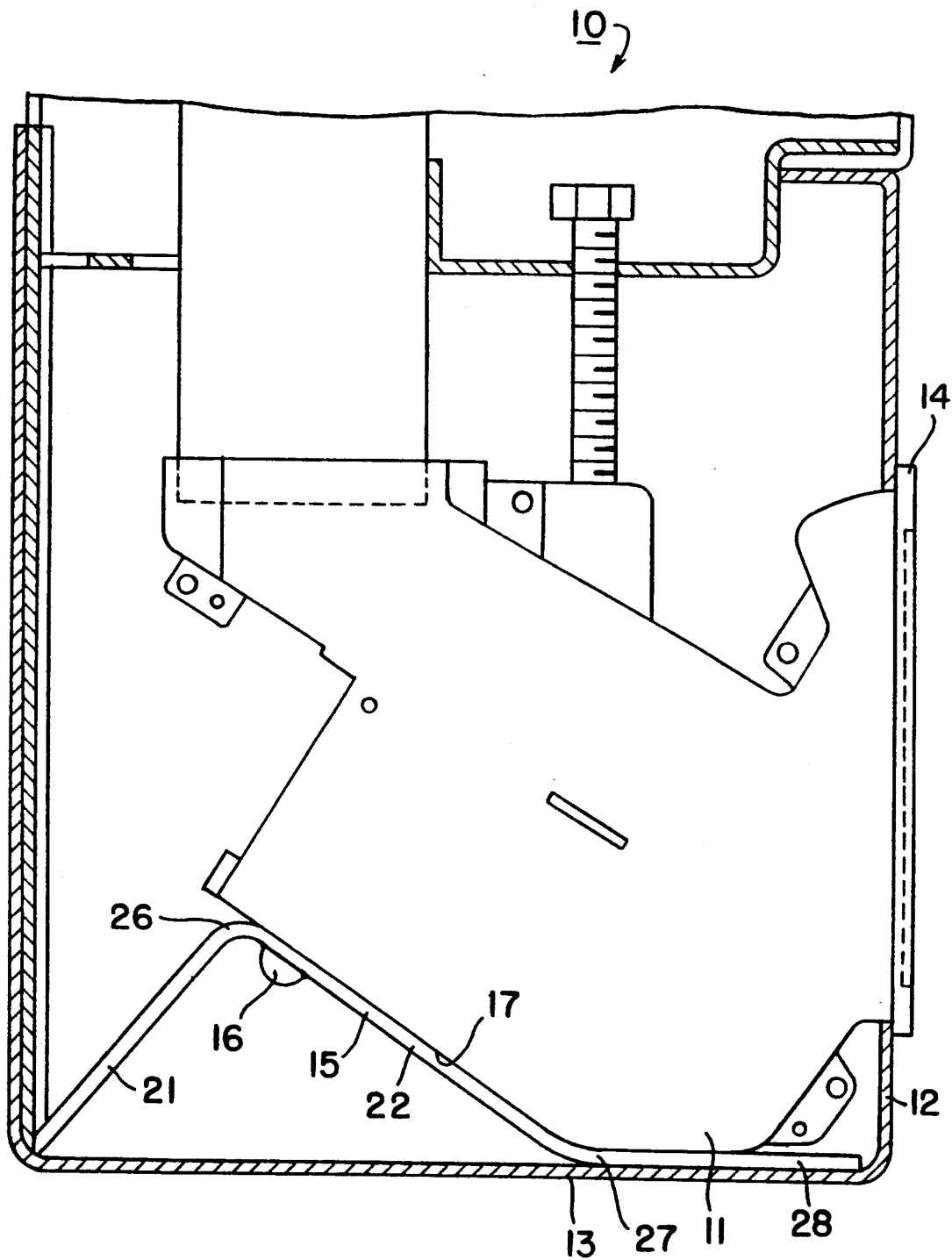
FIG. 1 shows a cross-section of the lower portion of a device having a coin return bucket.
Figure 2A:
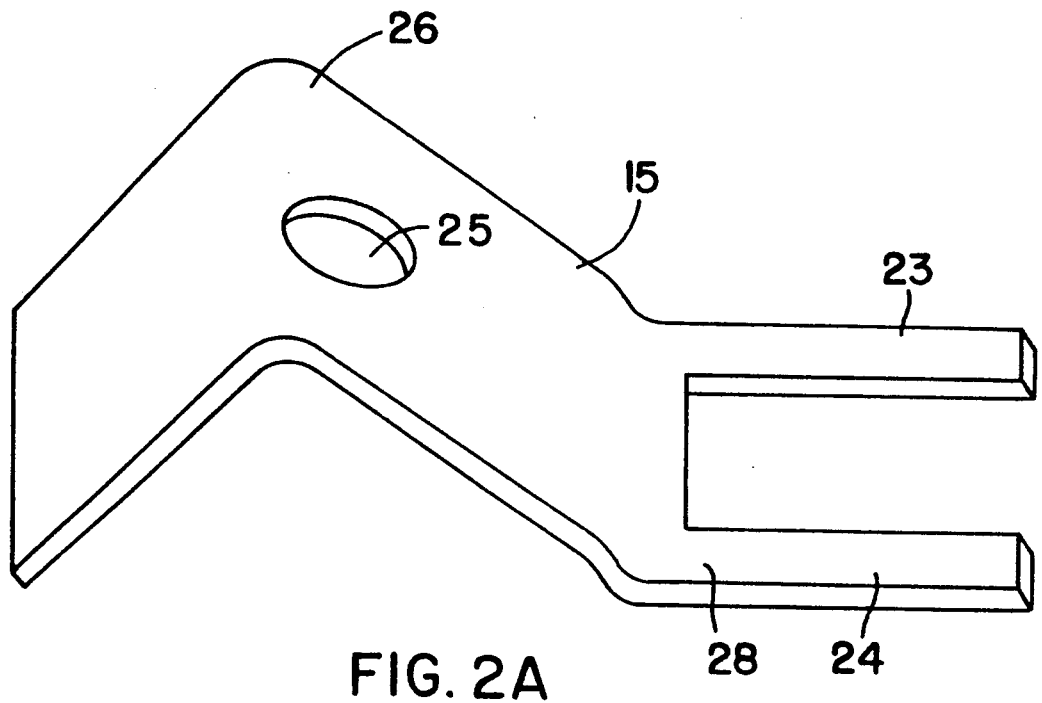
FIGS. 2A and 2B show perspective views of a coin return bucket with a bottom wall protection plate with two prong and with a rectangular section with an aperture in the place of the two prongs.
Figure 2B:
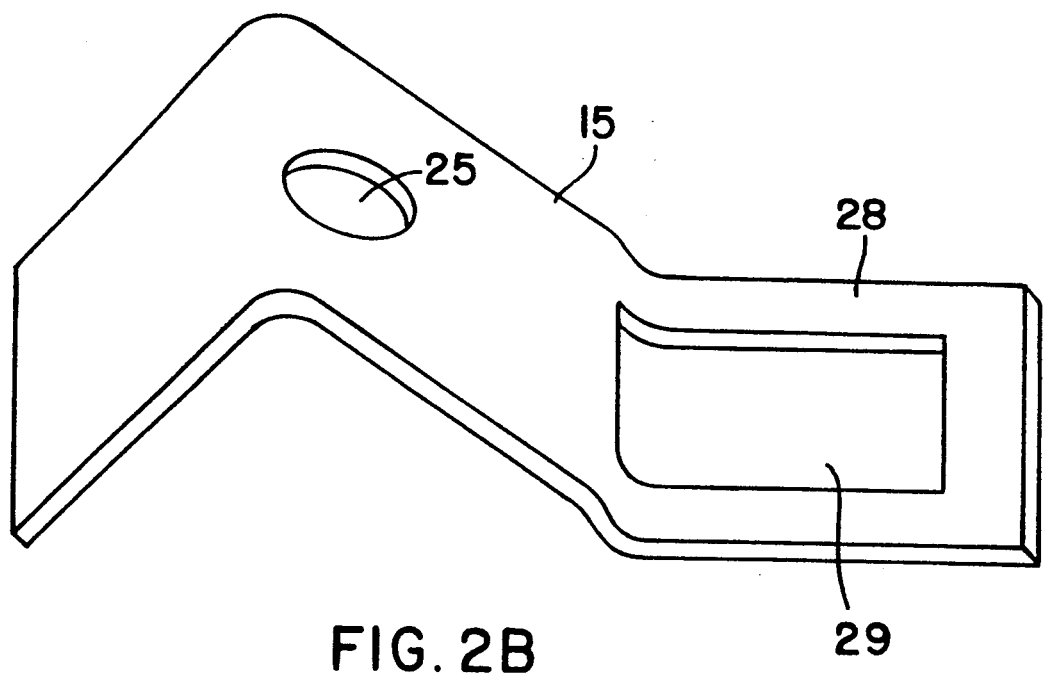

FIG. 1 depicts a cross-section of a device 10 having a coin return bucket 11 enclosed within. The device 10 has a front wall 12 and a bottom wall 13 which generally encompass the coin return bucket 11. Entry into the coin return bucket 11 is through a door 14 located on the front wall 12 of the device 10. A bottom Wall protection plate 15 is mounted inside device 10 along bottom Wall 13. In the embodiment shown, the plate 15 has an aperture (as seen in FIGS. 2A and 2B) through which a rivet 16 on the coin return bucket 11 can pass through. The plate is so constructed such that it follows the contours of the bottom 17 of the coin return bucket 11.

The plate 15 is also configured such that it can be placed under the coin return bucket 11 and mates closely therewith and with the bottom wall 13 of device 10. It is understood that, if it is desired, the plate 15 can be physically attached to the device 10 or the coin return bucket 11 or both using any suitable means which is known to those working in this art.

FIGS. 2A shows a perspective view of the bottom wall protective plate 15 and shows a configuration for the plate 15 which matches and mates with the bottom wall of coin return bucket 11 (as seen in FIG. 1. The plate 15 shown has a portion 21 which angles downwardly away from the apex portion 26 and coin return bucket 11 portion 21 can rest on the bottom wall 13 of the device 10. Aperture 25 is provided to allow passage therethrough of a mounting rivet 16 on the bottom 17 of coin bucket 11. It should be understood that the aperture may be present or absent and more than one aperture may be included at the option of one constructing the present plate. Portion 22 of plate 15 also slopes downwardly from apex 26 following the general contour of the bottom 17 of the coin return bucket 11 portion 22 meets the bottom wall 27 of the plate 15. A flat portion 22 of plate 15 extends generally from section 27 and is so contoured as to follow the contour of bottom wall 13 of device 10. Prongs 23 and 24 are provided in section 28 to stabilize plate 15, provide sufficient space to permit the coin return bucket 11 to rest properly on the bottom wall of the device and the door 14 to fit into the frame therefor, and to prevent movement thereof in the device 10. Testing with public pay phones has shown that the angles between portions 21 and 22 the angle between portion 22 and 28 of the plate 15 are important in preventing the penetration by the drill bit into the bottom wall of the bucket.

FIG. 2B shows a second embodiment of the bottom wall protection plate 15, wherein section 28 is provided with a rectangular aperture 29 in the place of prongs 23 and 24. The cross bar joining the prongs 23 and 24 serves to further reinforce the bottom wall protection plate to prevent the prying apart of the two prongs 23 and 24.

It is to be noted that the space between prongs 23 and 24 via aperture 29 is provided to accommodate the existing coin return bucket in the payphones. If the coin return bucket is modified or has a different bottom configuration, then the bottom wall protection plate may be suitably modified as is known to those working in this art.

Figure 3:
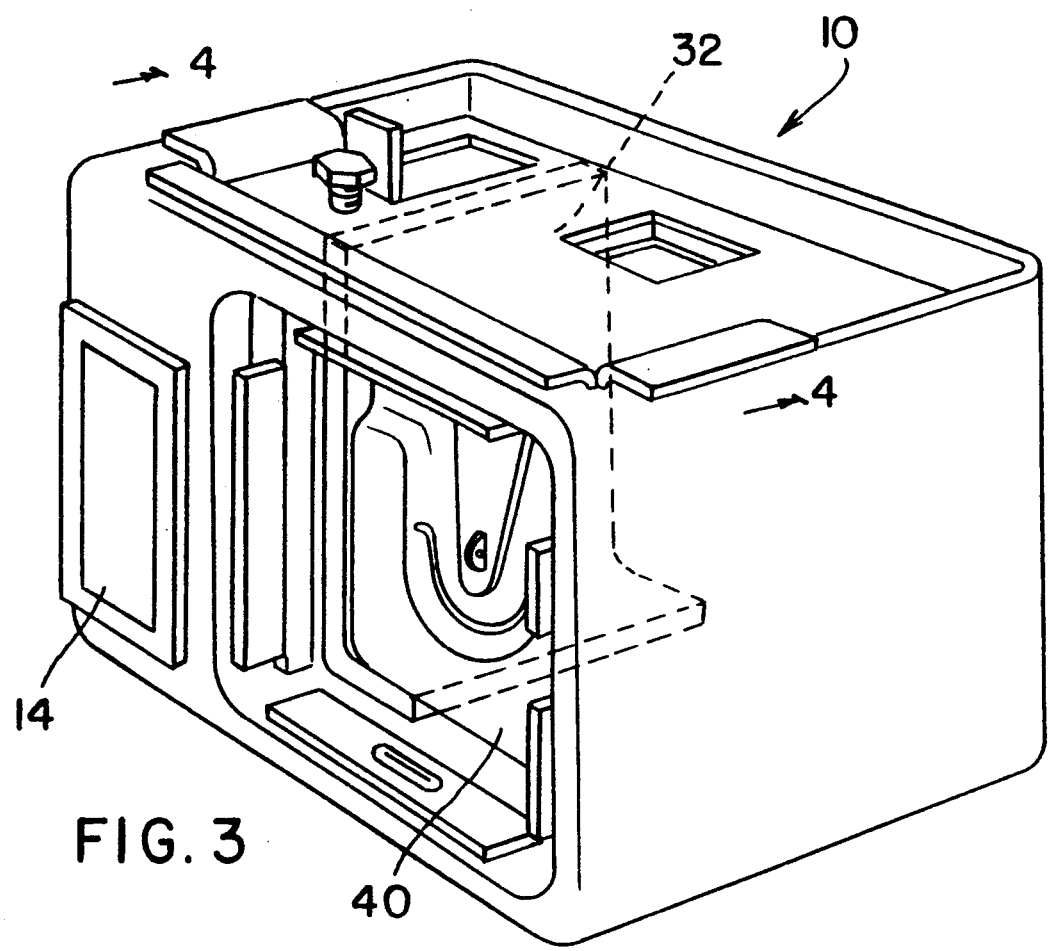
FIGS. 3 shows a perspective view of an inner wall protection plate for the bank box.
Figure 6:
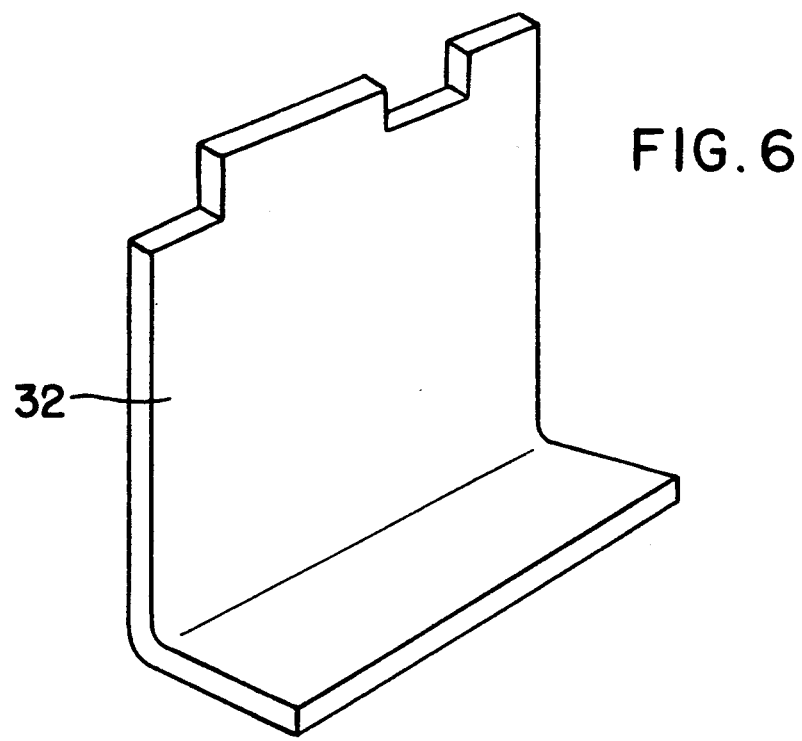
FIG. 6 is a perspective view of the inner protection plate.
Figure 4:
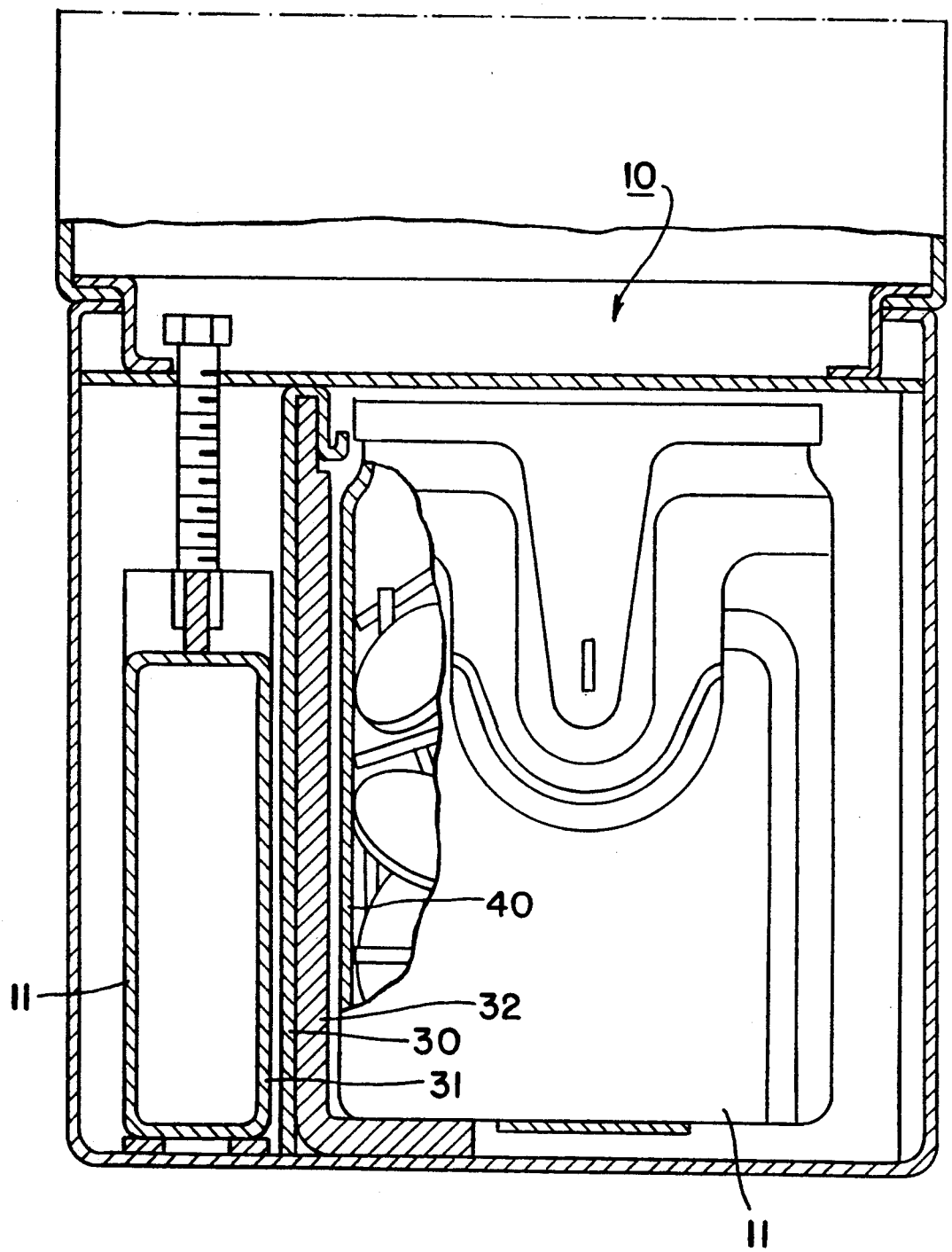
FIG. 4 shows a cross sectional view of the device with the inner wall protection plate inserted between the coin return bucket and the bank box along 4-4 indicated in FIG. 3.

FIG. 3 shows a perspective view of an inner wall protection plate 32 inserted between the wall of the bank box 40 and the inner wall 30 of the coin return bucket 11. FIG. 4 shows a cross section of the device with the inner wall protection plate 32 inserted between the inner wall 30 of the coin return bucket 11 and inner side wall of the bank box 40. The inner wall protection plate 32 is constructed so that the top portion of the side plate 32 comprises one or more cutouts to accommodate existing protruding parts in the payphone and is insertable into the space between the inner wall 30 and an inner side Wall of said bank box 40. See FIG. 6. It is to be understood that the cutouts on the top portion of side plate 32 accommodates existing parts in the payphone and may be omitted if such parts are absent. The bottom part of side plate 32 is bent in a right angle to provide support and anchor the side wall protection plate so that it fits snuggly against the inner side wall 30 and a portion of the bottom wall of the bank box 40.

Figure 5:
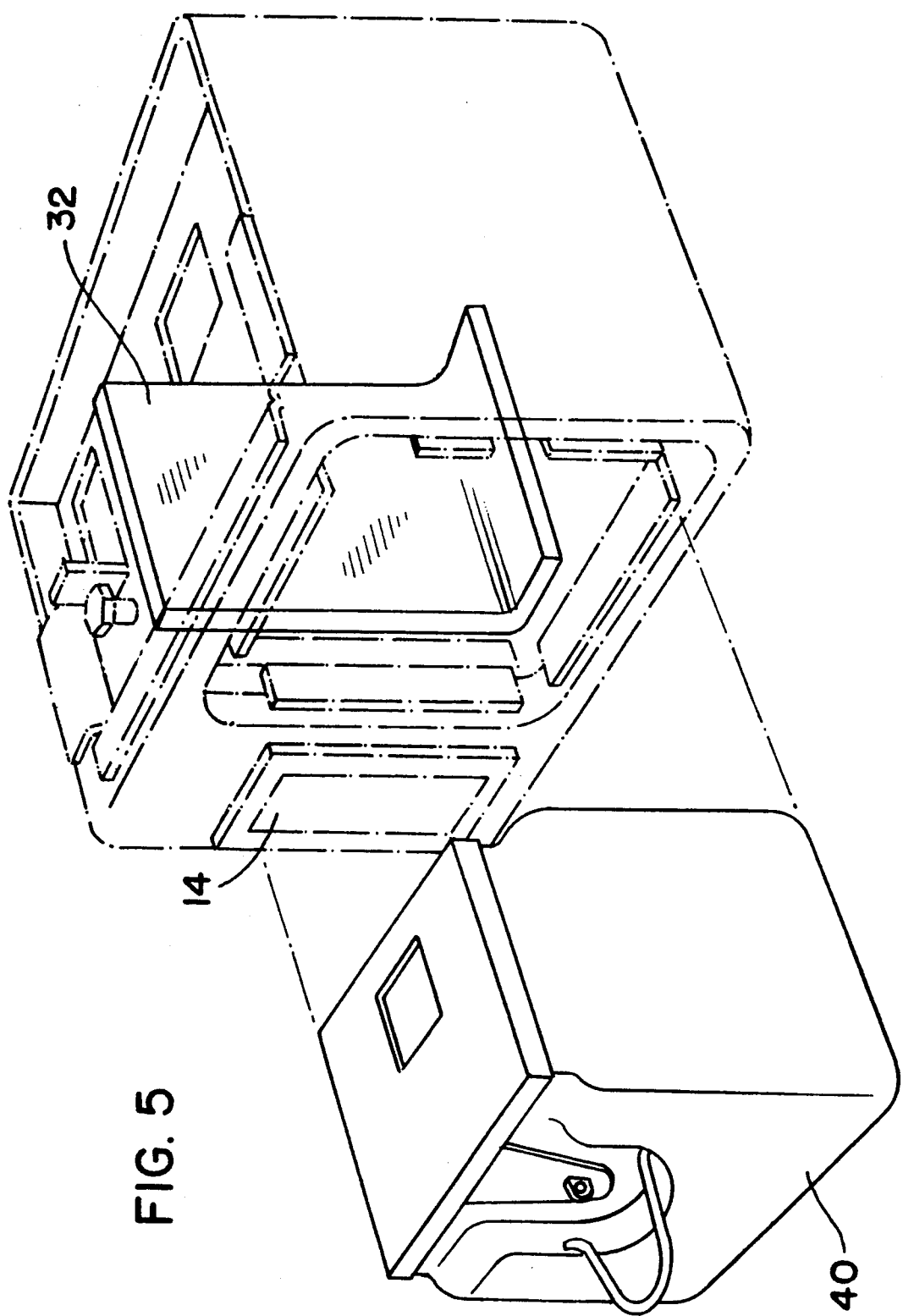
FIG. 5 shows another perspective view of the inner wall protection plate with the bank box removed.

FIG. 5 shows a perspective of the device with the inner wall protection plate with the bank box removed from the device.

The bottom wall protection plate and the inner sidewall protection plate of the present invention can be made from any suitable material which is resistant to penetration and cutting by penetration or cutting instruments. One such suitable material is 1018 cold rolled steel, for example. It has been found that 1018 cold rolled steel plate with a thickness of ¼" to ⅜", preferably 5/16", is suitable. It might also be noted that a protection plate which has some other suitable configuration in its front portion as denoted in FIG. 2A or FIG. 2B, is also contemplated as being within the scope of the present invention. Further, the bottom wall protection plate may be employed individually o in combination with the inner side wall protection plate.

The invention in its broader aspects is not limited to the specific embodiments herein shown and described but departures may be made therefrom within the scope of the accompanying claims, without departing from the principles of the invention and without sacrificing its chief advantages.

We claim:

1. In a coin operated device having a front wall, a back wall, a top wall and a bottom wall which are joined by a first side wall and a second side wall and containing therein a bank box having an inner side wall, an outer side wall and a bottom wall, and a coin return bucket having a throat with a top wall, a bottom wall, an outer first side wall and an inner first side wall wherein; said bank box and said coin return bucket are mounted side by side within the device near the bottom wall of the device, the improvement for preventing tampering with and vandalization of the device by cutting or penetration of the bottom wall of the coin return bucket wherein a first bottom wall protection plate means for preventing tampering and vandalization is inserted between the bottom wall of the device and the bottom wall of the coin return bucket, said first bottom wall protection plate means being so configured as to generally follow the contour of the bottom wall of the coin return bucket and has a rear portion which extends downwardly from a back end of the bottom wall of the coin return bucket to the bottom wall of the device and a front portion of which lies along the bottom wall of the device and which stabilizes the first bottom wall protection plate means from movement within the device.

2. The improved coin operated device according to claim 1, wherein the device is a coin-operated payphone.

3. The improved coin operated device according to claim 1, wherein the front portion of the first bottom wall protection plate means comprises prong projections which extend along the bottom wall of the device.

4. The improved coin operated device according to claim 3, wherein the device is a coin-operated payphone.

5. The improved coin operated device according to claim 1, wherein the front portion of the first bottom wall protection plate means is rectangular with a rectangular aperture and extends along the bottom wall of the device.

6. The improved coin operated device according to claim 5, wherein the device is a coin-operated payphone.

7. In a coin operated device having a front wall, a back wall, a top wall and a bottom wall which are joined by a first side wall and a second side wall and containing therein a bank box having an inner side wall, an outer side wall and a bottom wall, and a coin return bucket having a throat with a top wall, a bottom wall, an outer first side wall and an inner first side wall; wherein said bank box and said coin return bucket are mounted side by side within the device near the bottom wall of the device, the improvement for preventing tampering with and vandalization of the bank box by cutting or penetration of the inner side wall of the bank box wherein an inner side wall protection plate means for preventing tampering and vandalization has an upright portion which is inserted between the inner first side wall of the coin return bucket and the inner side wall of the bank box, said upright portion of said inner side wall protection plate means is a flat plate configured to be insertable between the first inner side wall of the coin return bucket and the inner side wall of the bank box, said inner side wall protection plate means having a bottom portion, bent in a right angle relative to said upright portion, which is inserted between the bottom wall of the coin operated device and the bottom wall of the bank box to stabilize the flat plate.

8. The improved coin operated device according to claim 7, wherein the device is a coin operated payphone.

9. The improved coin operating device according to claim 7 further comprising a first bottom wall protection plate means for preventing tampering and vandalization of the bottom wall of the coin return bucket, wherein said first bottom wall protection plate means is inserted between he bottom wall of the device and the bottom wall of the coin return bucket, said first bottom wall protection plate means being so configured as to generally follow the contour of the bottom wall of the coin return bucket and has a rear portion which extends downwardly from a back end of the bottom wall of the coin return bucket to the bottom wall of the device and a front portion of which lies along the bottom wall of the device and which stabilizes the first bottom wall protection plate means for movement within the device.

10. The improved coin operated device according to claim 9, wherein the device is a coin-operated payphone.

11. The improved coin operated device according to claim 9 wherein the front portion of the first bottom wall protection plate means comprises prong projections which extend along the bottom wall of the device.

12. The improved coin operated device according to claim 11, wherein the device is a coin-operated payphone.

13. The improved coin operated device according to claim 9, wherein the front portion of the first bottom wall protection plate means is rectangular with a rectangular aperture and extends along the bottom wall of the device.

14. The improved coin operated device according to claim 13, wherein the device is a coin-operated payphone.

* * * * *